(12) United States Patent
Park et al.

(10) Patent No.: US 9,637,622 B2
(45) Date of Patent: May 2, 2017

(54) ACRYLATE-STYRENE-ACRYLONITRILE POLYMER AND THERMOPLASTIC RESIN COMPOSITION

(71) Applicant: LG CHEM, LTD., Seoul (KR)

(72) Inventors: Chun Ho Park, Daejeon (KR); Min Jung Kim, Daejeon (KR); Yong Yeon Hwang, Daejeon (KR); Eun Soo Kang, Daejeon (KR); Sang Mi Lee, Daejeon (KR); Yeong Min Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/771,191

(22) PCT Filed: Aug. 20, 2014

(86) PCT No.: PCT/KR2014/007726
§ 371 (c)(1),
(2) Date: Aug. 27, 2015

(87) PCT Pub. No.: WO2015/026153
PCT Pub. Date: Feb. 26, 2015

(65) Prior Publication Data
US 2016/0152806 A1 Jun. 2, 2016

(30) Foreign Application Priority Data

Aug. 20, 2013 (KR) .................. 10-2013-0098214
Jun. 13, 2014 (KR) .................. 10-2014-0072433
Jun. 13, 2014 (KR) .................. 10-2014-0072434

(51) Int. Cl.
  *C08F 265/04* (2006.01)
  *C08L 13/00* (2006.01)
  *C08L 25/12* (2006.01)
  *C08L 33/08* (2006.01)
  *C08F 285/00* (2006.01)
  *C08L 51/06* (2006.01)
  *C08F 226/02* (2006.01)

(52) U.S. Cl.
CPC ............ *C08L 13/00* (2013.01); *C08F 265/04* (2013.01); *C08F 285/00* (2013.01); *C08L 25/12* (2013.01); *C08L 33/08* (2013.01); *C08F 226/02* (2013.01); *C08L 51/06* (2013.01)

(58) Field of Classification Search
None
See application file for complete search history.

(56) References Cited

U.S. PATENT DOCUMENTS

| 4,542,179 | A | * | 9/1985 | Falk | ............. | C08L 51/00 |
| | | | | | | 524/430 |
| 4,883,841 | A | * | 11/1989 | Riew | ............. | C08L 69/00 |
| | | | | | | 525/146 |
| 5,183,858 | A | * | 2/1993 | Sasaki | ............. | C08F 265/06 |
| | | | | | | 525/154 |
| 9,340,637 | B2 | * | 5/2016 | Ahn | ............. | C08F 265/04 |

FOREIGN PATENT DOCUMENTS

| CN | 1452639 A | 10/2003 |
| KR | 10-2006-0036523 A | 5/2006 |
| KR | 10-2007-0019411 A | 2/2007 |
| KR | 10-2008-0038589 A | 5/2008 |
| KR | 10-2009-0040111 A | 4/2009 |
| KR | 10-2013-0078379 A | 7/2013 |
| WO | WO 2013/100448 A1 | 7/2013 |

OTHER PUBLICATIONS

International search report for PCT/KR2014/007726 filed on Aug. 20, 2014.
Office Action from Chinese Patent Office for Application No. 201480013404.2, dated Sep. 1, 2016.

* cited by examiner

*Primary Examiner* — Vickey Nerangis

(57) ABSTRACT

The present invention relates to an acrylate-styrene-acrylonitrile polymer, a method for preparing the same, and a thermoplastic resin composition. More specifically, the present invention has an effect of providing an acrylate-styrene-acrylonitrile polymer, a method for preparing the same, and a thermoplastic resin composition, wherein an N-vinyl monomer is applied such that the polymerization can be initiated by a redox system under conditions in which a grafting agent is not used, thereby improving the grafting efficiency of the acrylate-styrene-acrylonitrile polymer and thus improving powder characteristics and impact resistance while maintaining dye-ability; the content of free shells is lowered to improve the coagulation and latex stability; the polymerization is performed by the redox system without an activation liquid of a shell layer, thereby reducing additives and thus improving pigment dye-ability and significantly improving weather resistance.

20 Claims, 1 Drawing Sheet

(a)

(b)

ACRYLATE-STYRENE-ACRYLONITRILE POLYMER AND THERMOPLASTIC RESIN COMPOSITION

CROSS REFERENCE TO RELATED APPLICATIONS

The present application is a U.S. National Stage of International Patent Application No. PCT/KR2014/007726 filed Aug. 20, 2014, which claims priority to Korean application number KR 10-2013-0098214, filed on Aug. 20, 2013, Korean application number KR 10-2014-0072433, filed on Jun. 13, 2014, and Korean application number KR 10-2014-0072434, filed on Jun. 13, 2014, which are incorporated by reference in their entirety.

TECHNICAL FIELD

The present invention relates to an acrylate-styrene-acrylonitrile polymer and a thermoplastic resin composition. More particularly, the present invention relates to an acrylate-styrene-acrylonitrile polymer having enhanced powder characteristics and impact resistance while maintaining colorability by enhancing grafting efficiency of the acrylate-styrene-acrylonitrile polymer through application of an N-vinyl monomer such that polymerization may be initiated by a redox system under a condition in which a grafting agent is not used, enhanced coagulation and latex stability through reduction of the content of free shells which are not grafted onto a core, and enhanced impact strength and dyeability, and dramatically enhanced weather resistance by decreasing additives through polymerization using a redox system without an activating solution for a shell layer and a thermoplastic resin composition.

BACKGROUND ART

Generally, acrylate-styrene-acrylonitrile based graft copolymers (hereinafter referred to as acrylate-styrene-acrylonitrile polymers) as impact modifiers for thermoplastic resins are made of multilayered copolymer graft particles, namely, in a core-shell structure. In order to enhance impact strength, acrylic rubber is mainly used as the core, and, in order to enhance colorability and dispersibility for a matrix resin, styrene-acrylonitrile based copolymers including a styrene monomer and acrylonitrile monomer (hereinafter referred to as SAN), etc. may be used as the shell.

Research to enhance impact characteristics through increase of soft rubber core parts and decrease of hard shell parts of acrylic impact modifiers having a core-shell structure is underway. However, when hard shells are decreased, latex stability and coagulation characteristics are deteriorated, and processing characteristics, etc. are affected. Therefore, technology for satisfactorily enveloping a soft rubber core with a small amount of a hard shell part is an important factor to enhance impact resistance, coagulation characteristics, processability, etc.

Accordingly, a variety of research regarding methods of satisfactorily enveloping a core with a shell or methods to enhance coagulation characteristics is underway. For example, in order to satisfactorily graft a shell onto a core, a compound having two double bonds or more that have different monomer reactivity was used as a grafting agent. However, when the grafting agent is used in a large amount, it functions like a cross-linking agent, and thus, impact strength may be decreased.

In addition, graft polymerization is performed on a core surface. Accordingly, when the grafting agent remains within the core, the total of the grafting agent might not participate in grafting reaction. Double bonds having low reactivity of the grafting agent remaining in the core may cause undesired side reaction, thereby leading to property deterioration (by causing defects/dents).

Recently, in order to prevent distortion and breakage of a rubber by hardening a rubber core in a multilayered copolymer graft particle, a hard seed was introduced.

Meanwhile, research into methods of satisfactorily enveloping a seed with a core or methods of enhancing coagulation characteristics is underway. For example, such that a core is satisfactorily grafted onto a seed, a compound having two double bonds or more that have different monomer reactivity was used as a grafting agent. However, when the grafting agent is used in a large amount, it functions like a cross-linking agent, and thus, impact strength may be decreased.

In addition, when the grafting agent remains within the seed, the total of grafting agent might not participate in grafting reaction, and double bonds having low reactivity with the grafting agent that remains within the seed cause undesired side reaction, thereby leading to property deterioration (by causing defects/dents).

Recently, emotional levels for quality of consumers are increasing, and thus, demand for resins that are not aged during much longer time is increasing. In particular, compositions having enhanced weather resistance are required in exterior materials and roofs of structures, computer housings, keyboards, electric devices, vehicle components, etc.

However, weather resistance is enhanced due to addition of additives, increase of the amount thereof and modification of combinations thereof, which is a major factor of production cost increase. In addition, when additives, etc. are jetted to gas during a process such as extrusion/injection, impurities, etc. may be observed on a surface of a molded product, and thus, commercial value of a molded product may be deteriorated.

In addition, an activating solution is used to initiate redox during polymerization, but functions as an impurity after processing, thereby deteriorating weather resistance.

Accordingly, research into technology to overcome the advantages described above is required.

DISCLOSURE

Technical Problem

Therefore, the present invention has been made in view of the above problems, and it is one object of the present invention to provide an acrylate-styrene-acrylonitrile polymer having enhanced powder characteristics and impact resistance while maintaining colorability by enhancing grafting efficiency of the acrylate-styrene-acrylonitrile polymer through application of an N-vinyl monomer such that polymerization may be initiated by a redox system under a condition in which a grafting agent is not used during preparation of the acrylate-styrene-acrylonitrile polymer, enhanced coagulation and latex stability through reduction of the content of free shells which are not grafted onto a core, and enhanced impact strength and dyeability, and dramatically enhanced weather resistance by decreasing additives through polymerization using a redox system without an activating solution for a shell layer.

It is another object of the present invention to provide a thermoplastic resin composition comprising the acrylate-styrene-acrylonitrile polymer described above as an impact modifier.

Technical Solution

In accordance with one aspect of the present invention, provided is an acrylate-styrene-acrylonitrile polymer comprising an acrylic rubber core and a SAN based shell, wherein the acrylate-styrene-acrylonitrile polymer comprises an outer enveloping amine-based monomer layer, and the SAN based shell is an activating-solution-free graft shell.

In accordance with another aspect of the present invention, provided is a thermoplastic resin composition comprising a thermoplastic resin and an impact modifier, wherein the impact modifier comprises the acrylate-styrene-acrylonitrile polymer described above, and the thermoplastic resin is a hard matrix resin.

Advantageous Effects

As apparent from the fore-going, the present invention enhances powder characteristics and impact resistance while maintaining colorability by enhancing grafting efficiency of the acrylate-styrene-acrylonitrile polymer through application of a specific amine-based monomer such that polymerization may be initiated by a redox system under a condition in which a grafting agent is not used, enhances coagulation and latex stability through reduction of the content of free shells, and dramatically enhances weather resistance while enhancing impact strength and dyeability by decreasing additives through polymerization using a redox system without an activating solution for a shell layer and a thermoplastic resin composition.

BEST MODE

Figure 1:
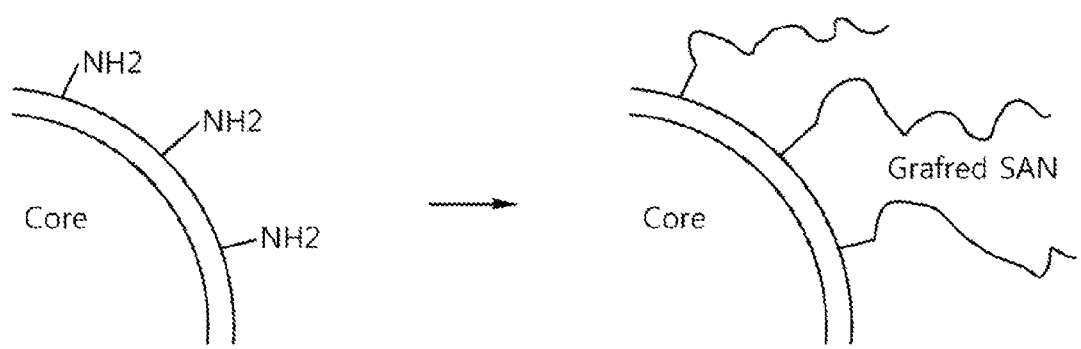
FIG. 1 is a schematic view illustrating that nitrogen radicals located along an outermost region of a core through an amine based monomer according to the present invention function as active sites of a SAN based shell.

Hereinafter, the present invention is described in detail.

An acrylate-styrene-acrylonitrile polymer according to the present invention comprises an acrylic rubber core and a SAN based shell, wherein the acrylate-styrene-acrylonitrile polymer comprises an outer enveloping amine-based monomer layer, and the SAN based shell is an activating-solution-free graft shell.

The acrylic rubber core comprises an outer enveloping amine-based monomer layer. In particular, the outer enveloping amine-based monomer layer may envelope the acrylic rubber core. Here, the expression "outer enveloping amine based monomer layer" means a layer enveloping along an outermost region of the acrylic rubber core and a layer comprising an amine based monomer ingredient.

For reference, reaction generating nitrogen radicals (N.) as an outer enveloping amine-based monomer layer in the presence of a peroxide initiator represented by ROOH on a surface of the acrylic rubber core may be summarized by Reaction Formula below.

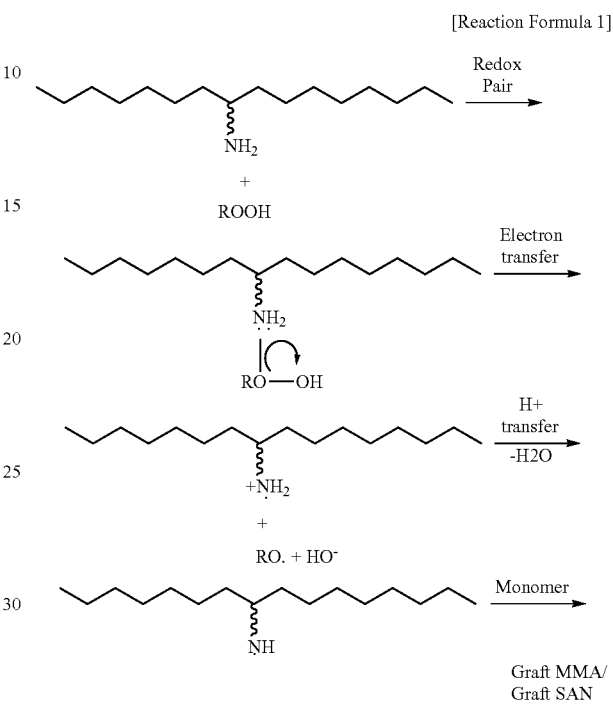

[Reaction Formula 1]

The amine based monomer may generate nitrogen radicals in the presence of the peroxide initiator and may be a monomer, which may be used without a grafting agent, having a double-bond and an amino group in a side chain.

Since an amine group is hydrophilic unlike a generally lipophilic grafting agent, the majority of polymerization is carried out on a surface of the outer enveloping amine-based monomer layer, instead of swelling and polymerization inside an acrylic rubber core. Accordingly, graft active site effects may also be maximized.

In an embodiment, the amine based monomer may be at least one selected from N-vinylformamide, N-vinylacetamide, N-vinylpropionamide, N-vinyl butyramide, N-vinyl 2-methyl propionamide, N-methyl acrylamide, N-ethyl acrylamide, N-n-propyl acrylamide, N-n-butyl acrylamide, N-isopropyl acrylamide, O-benzyl-N-vinylcarbamate, methyl N-vinylcarbamate and N-vinyl tert-butyl carbamate.

In an embodiment, the amount of the amine based monomer is 0.05 to 1 part by weight or 0.08 to 0.8 parts by weight based on the total weight of compositions constituting the copolymer. Within the ranges, nitrogen radicals, to which a shell may bind, as active sites may be effectively provided in the presence of a peroxide initiator.

As needed, the outer enveloping amine-based monomer layer may comprise an acrylic monomer and a cross-linking agent. In an embodiment, the acrylic core may be an emulsion polymer of 85 to 99.89% by weight of an ylacrylic compound and 0.1 to 5% by weight of a cross-linking agent, and the outer enveloping amine-based monomer layer may be an emulsion polymer of 0 to 5% by weight of an acrylic compound, 0.01 to 5% by weight of an amine based monomer and 0 to 0.5% by weight of a cross-linking agent. As needed, pH of the outer enveloping amine-based monomer layer may be adjusted to pH9 to pH11. In addition, the acrylic rubber core, as needed, may be prepared by combining with a conventional grafting agent.

Furthermore, when the graft polymerization is carried out, an alkyl methacrylate compound may be comprised in an amount of 70 parts or less by weight based on 100 parts by weight of a mixture comprising an aromatic vinyl compound and a vinyl cyano compound of the outer enveloping amine-based monomer layer.

In an embodiment, the acrylic rubber core may comprise a $C_1$ to $C_8$ alkyl acrylate.

In addition, a cross-linking acrylic agent may be comprised, with a very small amount of grafting agent, in an amount of 0.1 to 5 parts by weight, 0.1 to 1 part by weight, or 0.47 to 0.69 parts by weight, based on the total weight of compositions constituting the copolymer.

The expression "cross-linking acrylic agent" means, so long as not specified otherwise, a compound that comprises an unsaturated vinyl group such as allyl methacrylate and trimethylolpropane triacrylate, and functions as a cross-linking agent.

In an embodiment, the total amount of the cross-linking acrylic agent and an amine based monomer may be greater than 0.05 and 1.0 or less parts by weight, or 0.08 to 0.09 parts by weight based on the total weight of compositions constituting the copolymer.

The expression "grafting agent", so long as not specified otherwise, means a compound that comprises an unsaturated vinyl group having two different reactivity or more such as allyl methacrylate, and functions as a cross-linking agent and a grafting agent. The grafting agent may be comprised in an amount of to 0.5 parts by weight, which is lower than a conventionally used amount, based on the total weight of compositions constituting the copolymer, or may be substituted with a cross-linking agent.

The acrylic rubber core may comprise an activating solution depending upon initiator types. In an embodiment, an activating solution may be comprised in the presence of a peroxide based initiator, and might not be comprised in the presence of a persulfate based initiator. For reference, redox polymerization is initiated when an activating solution is comprised in the presence of the peroxide based initiator, redox polymerization is initiated when the activating solution is comprised in the presence of the persulfate based initiator, and thermal polymerization is initiated when the activating solution is not comprised in the presence of the persulfate based initiator.

The expression "activating solution" used in the present invention means, so long as not specified otherwise, an oxidation-reduction initiator such as formaldehyde sodium sulfoxylate, disodium ethylenediaminetetraacetate or ferrous sulfate, or a compound generally used for polymerization activation.

For reference, the activating solution according to the present invention may be only comprised in a core and might not be comprised in a shell. This is referred to as activating solution free. In addition, this serves to reduce additives due to polymerization through a redox system without an additional activating solution, thereby enhancing weather resistance.

The acrylic rubber core may be a soft core, and, in an embodiment, an average particle diameter of the acrylic rubber core may be 100 nm to 400 nm.

Figure 2:
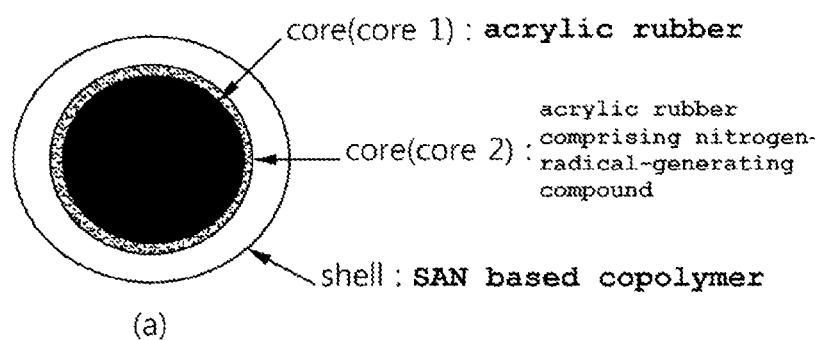
FIG. 2 is schematic views illustrating a core-shell particle morphology of each of Example 1 according to the present invention and Comparative Example 1 using a grafting agent according to conventional technology, (a) illustrates a core-shell particle morphology of Example 1, and (b) illustrates a core-shell particle morphology of Comparative Example 1.
Figure 2:
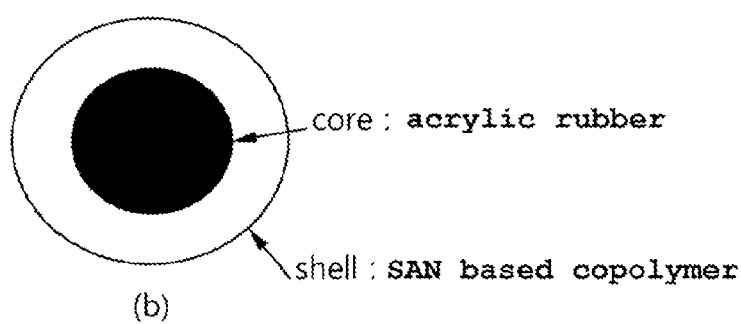

In addition, in FIG. 2 illustrating a schematic view of a core-shell particle morphology according to each of Example 1 and Comparative Example 1, (a) corresponding to Example 1 comprises an outer enveloping amine-based monomer layer that is not comprised in (b) corresponding to Comparative Example 1. In addition, since all regions of the outer enveloping amine-based monomer layer that thinly envelops a rubber core layer comprises graft active sites, grafting efficiency may be relatively maximized.

In addition, since a hydrophilic property is exhibited due to amine groups unlike a general lipophilic grafting agent, polymerization is carried out outside a surface of the outer enveloping amine-based monomer layer, instead of swelling and polymerization inside an acrylic rubber core. Accordingly, graft active site effects may be maximized.

In particular, as illustrated in FIG. 2(a), 90 to 99.99% of the acrylic rubber core and 0.01 to 10% of the outer enveloping amine-based monomer layer may be comprised based on weight.

In an embodiment, the SAN based shell is an activating solution free type comprising at least one monomer of $C_1$ to $C_8$ alkyl(meth)acrylate based monomers, styrene based monomers and acrylonitrile based monomers, may have an average particle diameter of 200 nm to 550 nm and may be a hard shell having a glass transition temperature of 80 to 120° C.

In an embodiment, the SAN based shell according to the present invention may be polymerized comprising 40 to 80% by weight of the acrylic core, 19 to 40% by weight of the aromatic vinyl compound, and 1 to 20% by weight of the vinyl cyano compound. Here, an average particle diameter of the shell may be 140 nm to 550 nm.

In an embodiment, in the acrylate-styrene-acrylonitrile polymer, the monomer constituting the acrylic core and the monomer constituting the SAN based shell may be comprised in a weight ratio of 40:60 to 80:20, 35:65 to 65:35, or 52:48 to 74:26, based on the total weight of compositions constituting the copolymer (See FIG. 2a).

In an embodiment, grafting efficiency of the acrylate-styrene-acrylonitrile polymer according to the present invention may be 70% or more, or 85% or more.

The acrylate-styrene-acrylonitrile polymer according to the present invention may be obtained as a powder type through liquid-coagulation and pulverization, or spray drying. In an embodiment, the acrylate-styrene-acrylonitrile polymer may be obtained as a powder through liquid-coagulation and pulverization at around 80° C.

In an embodiment, a method of preparing the acrylate-styrene-acrylonitrile polymer according to the present invention may be carried out through three steps below.

That is, the processes may comprise an acrylic rubber core preparation process in which 40 to 80 parts by weight of $C_1$ to $C_8$ alkyl acrylate and 0.1 to 0.5 parts by weight of a cross-linking acrylic agent are emulsion-polymerized;

a process of preparing an outer enveloping amine based monomer layer at an outer portion of the acrylic rubber core to which 0.05 to 1 part by weight of amine based monomer are input; and a process of preparing a hard shell by graft-polymerizing 20 to 60 parts by weight of at least one monomer selected from $C_1$ to $C_8$ alkyl(meth)acrylate based monomers, styrene based monomers and acrylonitrile based monomers, based on the total weight of compositions constituting the copolymer.

The emulsion-polymerization according to the present invention may be carried out in an isothermal manner or a non-isothermal manner at 30 to 80° C. An emulsifier used in the reaction may be a conventionally used emulsifier.

The acrylate-styrene-acrylonitrile polymer may be powderized through liquid-coagulation and pulverization near an optimal coagulation temperature of 80° C.

As needed, a seed may be comprised. In an embodiment, the seed may comprise at least one selected from $C_1$ to $C_8$ alkyl(meth)acrylate based monomers, styrene based monomers, acrylonitrile based monomers, a cross-linking acrylic agent, a grafting agent and an emulsifier.

The seed may have an average particle diameter of 50 nm to 200 nm.

The obtained acrylate-styrene-acrylonitrile polymer has enhanced coagulation properties and latex stability. In particular, an impact modifier for thermoplastic resins which may maintain impact strength by not using a grafting agent while increasing grafting efficiency may be provided.

In an embodiment, the impact modifier may be comprised in an amount of 1 to 50 parts by weight, or 20 to 50 parts by weight, based on 100 parts by weight of a mixture of the impact modifier and a hard matrix resin.

The thermoplastic resin may be a hard matrix resin, and may be at least one type selected from SAN, PMMA, PVC and PC.

The reaction that the outer enveloping amine-based monomer layer according to the present invention generates a seed surface, namely, nitrogen radicals (N.) in the presence of an initiator represented by ROOH, e.g., a peroxide initiator was summarized in Reaction Formula 2 below.

[Reaction Formula 2]

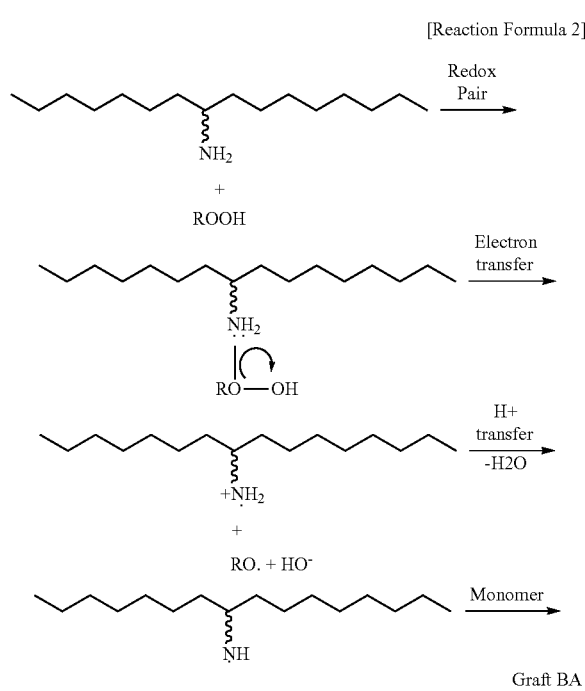

Here, the expression "outer enveloping amine based monomer layer" may mean that comprising an amine based monomer ingredient as a neighboring (boundary) layer between the seed and the acrylic core.

In an embodiment, the amine based monomer may be comprised in an amount of greater than 0.001 and less than 1 part by weight, or 0.01 to 0.05 parts by weight, based on the total weight of compositions constituting the copolymer. Within these ranges, nitrogen radicals as active sites to which an acrylic core may bind may be effectively provided in the presence of a peroxide initiator.

In addition, since hydrophilic properties are exhibited due to the amine group unlike a general lipophilic grafting agent, a majority of polymerization is carried out on a surface of the outer enveloping amine-based monomer layer instead of swelling and polymerization inside the seed. Accordingly, graft active site effects may also be maximized.

In an embodiment, the seed having the outer enveloping amine based monomer layer according to the present invention may comprise a two-layer structure that comprises a hard seed comprising at least one monomer selected from $C_1$ to $C_8$ alkyl(meth)acrylate based monomers, styrene based monomers and acrylonitrile based monomers, a persulfate initiator or a peroxide initiator, a cross-linking agent, and an emulsifier; and an outer enveloping amine based monomer layer.

In an embodiment, the total use amount of the cross-linking acrylic agent and the amine based monomer may be greater than 0.05 and 1.0 or less parts by weight, or 0.08 to 0.09 parts by weight based on the total weight of compositions constituting the copolymer.

In a specific embodiment, a gel content of the hard seed may be 95.0 to 99.8%, or 98.9 to 99.0%. In an embodiment, an average particle diameter of the hard seed may be 50 nm to 200 nm.

In an embodiment, the acrylic rubber core may comprise at least one monomer of $C_1$ to $C_8$ alkyl acrylate based monomers, and an emulsifier.

In a specific embodiment, the acrylic rubber core may be activating-solution-free, and a gel content thereof may be 85.0 to 99.5%, or 93.2 to 96.9%.

As described above, the activating solution is comprised in the seed or the shell, but might not be comprised in the core. This is referred to as activating solution free. In addition, grafting is started/grown from nitrogen radicals attached to the seed due to redox initiation of the amine monomer comprised in the outer enveloping seed layer, and core polymerization is performed. In this case, grafting might not be satisfactorily carried out when the activating solution is applied to the core, and the content of impurities may be relatively decreased by not adding the activating solution. Accordingly, coloring and weather resistance of final products may be enhanced.

In an embodiment, the multilayered copolymer according to the present invention may comprise a monomer constituting the seed, a monomer constituting the acrylic core, and a monomer constituting the SAN based shell in a weight ratio of 5 to 15:25 to 75:20 to 60, or 5 to 15:50 to 55:35 to 40, based on the total weight of compositions constituting the copolymer.

As the emulsifier, a conventionally used emulsifier may be used in seed emulsion-polymerization of ASA copolymer, and a particle diameter may be controlled by controlling the use amount of the emulsifier.

A cross-linking agent used in the seed and the core may be an acrylic compound having the same monomer reactivity and two double bonds or more. In an embodiment, ethylene glycol dimethacrylate, trimethylolpropane triacrylate, etc. may be used.

A grafting agent used in the core may be an acrylic compound having two double bonds or more that have different monomer reactivity. In an embodiment, allyl methacrylate, etc. may be used.

The multilayered acrylic copolymer according to the present invention may be obtained in a powder type through liquid-coagulation and pulverization, or spray drying. In an embodiment, the powder may be obtained by drying with hot wind after atmospheric coagulation using an aqueous calcium chloride solution.

In an embodiment, the multilayered acrylic copolymer according to the present invention may be carried out through processes below.

That is, the method may comprise a hard seed preparation process through emulsion-polymerization of at least one monomer selected from $C_1$ to $C_8$ alkyl(meth)acrylate based monomers, styrene based monomers and acrylonitrile based monomers, and a cross-linking agent; a preparation process of an outer enveloping layer of an amine based monomer through input of an amine based monomer to an outermost of the hard seed; an acrylic core preparation process through emulsion-polymerization of at least one monomer from selected $C_1$ to $C_8$ alkyl acrylate based monomers that envelops the outer enveloping layer, a cross-linking agent and a grafting agent in the presence of a peroxide initiator; and a hard shell preparation process through graft polymerization of at least one monomer selected from $C_1$ to $C_8$ alkyl(meth)acrylate based monomers that envelops the acrylic core, styrene based monomers and acrylonitrile based monomers.

In an embodiment, the total amount of the amine based monomer and cross-linking acrylic agent may be greater than 0.05 and 1.0 or less parts by weight based on the total weight of compositions constituting the copolymer.

The multilayered acrylic copolymer may be further subjected to a powderization process.

In a preparation process of each of the seed and the shell, polymerization may be carried out in the presence of the persulfate initiator or the peroxide initiator.

The emulsion-polymerization according to the present invention may be carried out in an isothermal manner or a non-isothermal manner at 30 to 80° C.

Now, the present invention will be described in more detail with reference to the following examples. These examples are provided only for illustration of the present invention and should not be construed as limiting the scope and spirit of the present invention. In particular, hereinafter, seed emulsion-polymerization is initiated so that Example and Comparative Example are specified and particle sizes are the same, but the present invention is not limited to technology comprising the seed.

For reference, the average diameter of latex below was measured using intensity Gaussian distribution (Nicomp 380) according to dynamic laser light scattering, and gel contents were measured by centrifuging after stirring for 24 hours in acetone.

EXAMPLE 1

Seed Latex 40 parts by weight of distilled water was input to a polymerization reactor substituted with a nitrogen atmosphere and temperature was elevated to 75° C. Subsequently, 0.025 parts by weight of potassium persulfate was added thereto batchwise and reaction was initiated. Subsequently, 4 parts by weight of styrene, 1 part by weight of acrylonitrile, 0.05 parts by weight of Na2CO3, 0.025 parts by weight of allyl methacrylate, 0.025 parts by weight of ethylene glycol dimethacrylate and 0.1 parts by weight of sodium lauryl sulfate were mixed and continuously input thereto at 75° C., thereby preparing hard seed latex having an average diameter of 150 nm.

<Acrylic Rubber Core>

A mixture comprising 60 parts by weight of distilled water, 55 parts by weight of butylacrylate, 0.3 parts by weight of ethylene glycol dimethacrylate, 0.3 parts by weight of allyl methacrylate, 0.5 parts by weight of cumene hydro peroxide and 0.6 parts by weight of sodium lauryl sulfate was continuously added to the prepared hard seed latex at 75° C. and polymerized, thereby preparing an acrylic rubber core.

<Core Comprising Amine Based Monomer-Containing Outer Enveloping Layer>

0.3 parts by weight of n-vinylformamide (NVF) as an amine based monomer was directly added batchwise to the reaction upon completion of the continuous input in the step <Acrylic rubber core>, and an amine based monomer-containing outer enveloping layer was comprised, thereby preparing a rubber core having a total average diameter of 380 nm. 3 parts by weight of washing water was added thereto, thereby finishing the reaction. Here, the total amount of a monomer of a seed and the rubber core, a cross-linking agent and amine based monomer was 95 parts by weight.

<Shell>

Polymerization of a mixture comprising 50 parts by weight of distilled water, 30 parts by weight of styrene, 10 parts by weight of acrylonitrile, 0.5 parts by weight of cumene hydro peroxide and 0.65 parts by weight of sodium lauryl sulfate was carried out while continuously inputting the same to the reactor having the core comprising the amine based monomer-containing outer enveloping layer. In addition, additional reaction was carried out for one hour at 75° C. after completing input of the mixture in order to increase a polymerization transition ratio, and the polymerization was finished by cooling up to 60° C., thereby preparing latex having a structure wherein a shell envelops the amine based monomer-containing outer enveloping layer. A polymerization transition ratio of the prepared graft copolymer latex was 98%, and a solid content thereof was 40% by weight <Multilayered Copolymer Powder>

The prepared graft copolymer latex was subjected to atmospheric coagulation at 80° C. using an aqueous calcium chloride solution, and then, aged, washed and dehydrated at 95° C. Subsequently, drying was carried out with 90 r wind for 30 minutes, thereby obtaining a multilayered copolymer powder.

<Thermoplastic Resin Composition>

Based on 100 parts by weight of a thermoplastic resin composition, 44 parts by weight of graft copolymer and 56 parts by weight of a styrene-acrylonitrile copolymer (having a weight ratio of 75:25) as a hard matrix were mixed, and 2 parts by weight of a lubricant, 0.3 parts by weight of an antioxidant and 0.3 parts by weight of a UV Stabilizer and 1 part by weight of carbon black were mixed therewith. Subsequently, the resultant mixture was prepared in a pellet type in a 200° C. cylinder temperature using a 40φ extrusion kneader and injected, thereby preparing a specimen.

EXAMPLE 2

A specimen was prepared by repeating the same process as in Example 1, except that 1 part by weight of n-vinylformamide (NVF) was added in the step <Core comprising amine based monomer-containing outer enveloping layer> of Example 1.

EXAMPLE 3

A specimen was prepared by repeating the same process as in Example 1, except that 0.15 parts by weight of n-vinylformamide (NVF) was added in the step <Core comprising amine based monomer-containing outer enveloping layer> of Example 1.

COMPARATIVE EXAMPLE 1

A specimen was prepared by repeating the same process as in Example 1, except that n-vinylformamide (NVF) was not used in the step <Core comprising amine based monomer-containing outer enveloping layer> of Example 1, and 0.144 parts by weight of SFS, 0.02 parts by weight of EDTA and 0.01 parts by weight of FES were added as activating solutions in the step <Shell>.

COMPARATIVE EXAMPLE 2

A specimen was prepared by repeating the same process as in Example 1, except that 0.144 parts by weight of SFS, 0.02 parts by weight of EDTA and 0.01 parts by weight of FES were added as activating solutions in the step <Shell> of Example 1.

COMPARATIVE EXAMPLE 3

A specimen was prepared by repeating the same process as in Example 2, except that 0.144 parts by weight of SFS, 0.02 parts by weight of EDTA and 0.01 parts by weight of FES were added as activating solutions in the step <Shell> of Example 2.

COMPARATIVE EXAMPLE 4

A specimen was prepared by repeating the same process as in Example 3, except that 0.144 parts by weight of SFS, 0.02 parts by weight of EDTA and 0.01 parts by weight of FES were added as activating solutions in the step <Shell> of Example 3.

Polymers obtained according to Examples and Comparative Examples were separated into particles and dried, and swelled by soaking in acetone at room temperature. Subsequently, centrifugation was carried out at 12000 rpm, at 0° C. for 120 minutes, and acetone-insoluble gel and acetone-soluble sol were collected and dried in a hot wind dryer. The resultant products were calculated according to equations below.

Gel content %=(the weight of dried gel/the total weight of impact modifier)×100

Graft ratio %=(the total weight of grafted monomer/the total weight of shell monomer)×100

In addition, impact strength, dyeability and weather resistance of the obtained specimens were measured as follows, and results thereof were summarized in Table 1 below.

<Property Evaluation Test>

Izod impact strength (23° C., ¼ inches, kg·cm/cm): was measured according to ASTM D256.

Dyeability: 1 wt % carbon black was added upon processing resins, and L values of colorability-measured specimens were measured using a color difference meter. Dark black is exhibited with deceasing L value, which means good colorability.

Weather resistance: specimens were stood for 5000 hours according to ASTM G155-1 using a Weather-Ometer, and then discoloration degrees (△) thereof were measured using a color difference meter. Here, △ means an average value of CIE Lab values before and after weather resistance experiments. As the value approaches 0, weather resistance is good.

TABLE 1

| Classification | Use of shell activating solution | Amine based monomer (parts by weight) | Gel content (%) | Impact strength | Pigment colorability | Weather resistance |
|---|---|---|---|---|---|---|
| Example1 | X | 0.3 | 82 | 23 | 29.0 | 2.9 |
| Example2 | X | 1 | 85 | 23 | 29.7 | 3.2 |
| Example3 | X | 0.15 | 80 | 22 | 28.3 | 3.1 |
| Comparative Example1 | ○ | 0 | 70 | 21 | 31.5 | 4.7 |
| Comparative Example2 | ○ | 0.3 | 64 | 19 | 31.7 | 5.1 |
| Comparative Example3 | ○ | 1 | 61 | 13 | 32.6 | 4.5 |
| Comparative Example4 | ○ | 0.15 | 68 | 19 | 30.8 | 5.1 |

As shown in Table 1, it can be confirmed that, whereas the ASA resin compositions of Examples 1 to 3 according to the present invention have a gel content of 80 to 85%, an Izod impact strength of 22 to 23, a dyeability of 28.3 to 29.7 and a weather resistance of 2.9 to 3.2, the composition of Comparative Example 1 which does not comprise the amine based monomer and comprises the activating solution in the shell has Charpy impact strength of 21, which is similar to those of the examples, due to remaining additives, but poor values such as a gel content of 70%, a dyeability of 31.5 and a weather resistance of 4.7.

In addition, it can be confirmed that, Comparative Examples 2 to 4 which comprise the amine based monomer but have the shell comprising the activating solution exhibit poor results such as a gel content 61 to 68%, an impact strength of 13 to 19, a dyeability of 30.8 to 32.6 and a weather resistance of 4.5 to 5.1.

EXAMPLE 4

Seed Latex 9 parts by weight of a styrene monomer, 1 part by weight of an acrylonitrile monomer, 0.05 parts by weight of ethylene glycol dimethacrylate, 0.05 parts by weight of allyl methacrylate, 0.02 parts by weight of sodium lauryl sulfate and 58.9 parts by weight of distilled water were added batchwise to a polymerization reactor substituted with a nitrogen atmosphere, and temperature was elevated up to 70° C. Subsequently, 0.05 parts by weight of potassium persulfate was added thereto batchwise to initiate reaction, and then reaction was carried out for one hour.

Nitrogen washing was continuously carried out until reaction was terminated, and seed polymerization was carried out while maintaining temperature of the reactor at 70° C. A polymerization transition ratio of the seed latex was 99%, the total solid content (TSC) thereof was approximately 14% by weight, and a latex average diameter thereof was 200 nm.

<Acrylic Rubber Core>

A mixture comprising 42.1 parts by weight of distilled water, 50 parts by weight of butyl acrylate, 0.3 parts by weight of ethylene glycol dimethacrylate, 0.5 parts by weight of potassium persulfate and 0.4 parts by weight of sodium lauryl sulfate was continuously added to the seed latex at 70° C. for three hours, thereby preparing acrylic rubber core latex.

<Core Comprising Outer Enveloping Amine-Based Monomer Layer>

0.3 parts by weight of n-vinylformamide (NVF) was directly added batchwise to the acrylic rubber core latex. Nitrogen washing was continuously carried out until reaction is finished, and temperature of the reactor was constantly maintained at 70° C. for one hour. Subsequently, additional aging was carried out at 70° C. for one hour while maintaining pH 10 through addition of KOH, thereby completing core latex comprising an outer enveloping amine-based monomer layer.

A total solid content (TSC) of the prepared core latex was approximately 36% by weight, and an average particle diameter of the latex was 355 nm.

<Shell>

Polymerization was carried out while continuously adding a mixture that comprises 30 parts by weight of a styrene monomer, 10 parts by weight of an acrylonitrile monomer, 0.4 parts by weight of t-butylhydroperoxide, 0.4 parts by weight of sodium lauryl sulfate and 42.3 parts by weight of distilled water to the core latex comprising the outer enveloping amine-based monomer layer at 70° C. for two hours.

Reaction was additionally carried out for one hour in order to increase polymerization transition ratio after terminating the continuous addition, and polymerization was terminated after cooling inner temperature of the reactor to 60° C., thereby obtaining graft copolymer latex that has a seed-core-shell structure having an average diameter of 502 nm. A total solid content of the graft copolymer latex was approximately 39.5% by weight.

<Graft Copolymer Powder>

The graft copolymer latex was subjected to atmospheric coagulation at 80° C. using an aqueous calcium chloride solution and aged at 95° C. After washing and dehydrating, drying was carried out with 90° C. wind for 30 minutes, thereby obtaining a graft copolymer powder.

COMPARATIVE EXAMPLE 5

The same process as in Example 4 was carried out, except that 0.3 parts by weight of allyl methacrylate (AMA) was added in the step <Acrylic rubber core>, the step <Core comprising an outer enveloping amine-based monomer layer> was omitted, and 0.3 parts by weight of an activating solution was added in the step <Shell>.

COMPARATIVE EXAMPLE 6

The same process as in Example 4 was carried out, except that vinylformamide (NVF) was used instead of allyl methacrylate (AMA) the step <Core comprising outer enveloping amine-based monomer layer>, and 0.3 parts by weight of an activating solution was used in the step <Shell>.

COMPARATIVE EXAMPLE 7

The same process as in Example 4 was carried out, except that 0.3 parts by weight of an activating solution was added in the step <Shell>.

EXAMPLE 5

The same process as in Example 4 was repeated, except that butyl acrylate was added in an amount of 45 parts by weight instead of 50 parts by weight of butyl acrylate in the step <Acrylic rubber core>.

Subsequently, the step <Core comprising outer enveloping amine-based monomer layer> was carried out as follows, and the step <Shell> was identically, repetitively carried out as in Example 4.

<Core Comprising Outer Enveloping Amine-Based Monomer Layer>

An emulsion containing 7.8 g of deionized water, 4 parts by weight of butyl acrylate, 0.1 parts by weight of ethyldiaminemethacrylate, 0.1 parts by weight of sodium lauryl sulfate and 1 part by weight of n-vinylformamide, and 0.05 parts by weight of potassium persulfate were directly added batchwise to the obtained acrylic rubber core latex. Nitrogen washing was continuously carried out until reaction was terminated, and the reactor was constantly maintained at 70° C. for one hour. Subsequently, aging was carried out for one hour at 70° C. while maintaining pH 10 through addition of KOH, thereby completing core latex comprising the outer enveloping amine-based monomer layer.

COMPARATIVE EXAMPLE 8

The same process as in Comparative Example 5 was repetitively carried out except that, in the step <Acrylic rubber core>, 0.3 parts by weight of allyl methacrylate (AMA) was used instead of 1 part by weight of vinylformamide (NVF) and 49 parts by weight of butylacrylate, and, in the step <Shell>, an activating solution was not added.

COMPARATIVE EXAMPLE 9

The same process as in Example 4 was repetitively carried out except that, in the step <Acrylic rubber core>, butyl acrylate was used in an amount of 35 parts by weight instead of 50 parts by weight.

Subsequently, the step <Core comprising outer enveloping amine-based monomer layer> was carried out as follows, and the step <Shell> was carried out in the same manner as in Example 4.

<Core Comprising Outer Enveloping Amine-Based Monomer Layer>

An emulsion containing 7.8 g of deionized water, 5 parts by weight of butyl acrylate, 0.1 parts by weight of ethyldiaminemethacrylate, 0.1 parts by weight of sodium lauryl sulfate and 10 part by weight of n-vinylformamide, and 0.05 parts by weight of potassium persulfate were directly, continuously added to the acrylic rubber core latex. Nitrogen washing was continuously carried out until reaction was terminated, and the reactor was constantly maintained at 70° C. for one hour. Subsequently, aging was carried out for one hour at 70° C. while maintaining pH10 through addition of KOH, thereby completing core latex comprising the outer enveloping amine-based monomer layer.

COMPARATIVE EXAMPLE 10

The same process as in Example 4 was repetitively carried out except that, in the step <Acrylic rubber core>, butyl acrylate was used in an amount of 50 parts by weight instead of 35 parts by weight.

Subsequently, the step <Core latex comprising outer enveloping amine-based monomer layer> was carried out as follows, and the step <Shell> was carried out in the same manner as in Example 4.

<Core Latex Comprising Outer Enveloping Amine-Based Monomer Layer>

An emulsion containing 7.8 g of deionized water, 14 parts by weight of butyl acrylate, 0.1 parts by weight of ethyldiaminemethacrylate, 0.1 parts by weight of sodium lauryl sulfate and 1 part by weight of n-vinylformamide, and 0.05 parts by weight of potassium persulfate were directly, continuously added to the acrylic rubber core latex. Nitrogen washing was continuously carried out until reaction was terminated, and the reactor was constantly maintained at 70° C. for one hour. Subsequently, aging was carried out for one hour at 70° C. while maintaining pH 10 through addition of KOH, thereby completing a core latex comprising the outer enveloping amine-based monomer layer.

COMPARATIVE EXAMPLE 11

The same process as in Example 5 was repeated except that, in the step <Shell>, 0.3 parts by weight of an activating solution was added.

EXAMPLE 6

The same process as in Example 4 was repeated except that, in the step <Acrylic rubber core>, butyl acrylate was added in an amount of 60 parts by weight instead of 50 parts by weight.

COMPARATIVE EXAMPLE 12

The same process as in Comparative Example 5 was repeated except that, in the step <Acrylic rubber core>, butyl acrylate was added in an amount of 60 parts by weight instead of 50 parts by weight.

ADDITIONAL EXPERIMENTAL EXAMPLE

The same process as in Example 4 was carried out, except that 0.15 parts by weight of allyl methacrylate was added in the step <Acrylic rubber core> and vinylformamide was added in an amount of 0.15 parts by weight instead of 0.3 parts by weight in the step <Core comprising outer enveloping amine-based monomer layer>.

ADDITIONAL COMPARATIVE
EXPERIMENTAL EXAMPLE

The same process as in Additional Experimental Example was repetitively carried out except that, in the step <Shell>, 0.3 parts by weight of an activating solution was added.

<Thermoplastic Resin Composition>

40 parts by weight of the graft copolymer powder, 60 parts by weight of SAN resin (90HR, LG Chemistry) as a hard matrix resin, 2 parts by weight of a lubricant, 0.3 parts by weight of an antioxidant and 0.3 parts by weight of a UV Stabilizer and 1 part by weight of carbon black were mixed based on 100 parts by weight of the thermoplastic resin composition and then prepared in a thermoplastic resin composition pellet type in a 200° C. cylinder using a 40ϕ extrusion kneader. The thermoplastic resin composition pellet was injected to prepare a specimen. Izod impact strength and the like of the specimen were measured, and results are summarized in Tables 2 to 4 below.

TABLE 2

|  | Example 4 | Comparative Example 5 | Comparative Example 6 | Comparative Example 7 |
|---|---|---|---|---|
| Presence or absence of activating solution | X | O | O | O |
| Amine based monomer (parts by weight) | 0.3 | 0 | 0 | 0.3 |
| Theoretical gel content (%) | 60 | 60 | 60 | 60 |
| Measured gel content (%) | 81 | 72 | 76 | 64 |
| Graft ratio (%) | 52 | 31 | 40 | 10 |
| Particle diameter (coagulation temperature 80° C.) | | | | |
| 20 mesh on* | 21 | 39 | 35 | 40 |
| 100 mesh on* | 69 | 57 | 61 | 58 |
| Pass* | 10 | 4 | 4 | 2 |
| Impact strength | 18.5 | 16.3 | 13.2 | 14.1 |

*"20 mesh on" means particles that do not pass through a mesh size of 0.841 mm, "100 mesh on" means particles that pass through a mesh size of 0.841 mm but do not pass through a mesh size of 0.149 mm, and "Pass" means particles that pass through a mesh size of 0.149 mm.

As shown in Table 2, Example 4 in which a specific amount of amine based monomer was used and an activating solution was not used exhibits a higher gel content and graft ratio, and superior impact strength, when compared with Comparative Examples 5 to 7 in which allyl methacrylate as a conventional grafting agent and the activating solution were used.

In particular, Comparative Example 6 exhibits an enhanced graft ratio by using allyl methacrylate instead of the amine based monomer, when compared with Comparative Example 5, but exhibits poor tensile strength and elongation. Accordingly, it may be supposed that an entanglement degree with a matrix resin becomes poor.

Meanwhile, as shown in Comparative Example 7, it can be confirmed that, when a specific amount of the amine based monomer is used but the activating solution is comprised, grafting is not performed and a large amount of new polymers is generated, whereby a core gel content, graft ratio, impact strength, etc. are poor.

TABLE 3

|  | Example 5 | Comparative Example 8 | Comparative Example 9 | Comparative Example 10 | Comparative Example 11 |
|---|---|---|---|---|---|
| Activating solution | X | X | X | X | O |

TABLE 3-continued

|  | Example 5 | Comparative Example 8 | Comparative Example 9 | Comparative Example 10 | Comparative Example 11 |
|---|---|---|---|---|---|
| Amine based monomer (parts by weight) | 1 | 1 | 10 | 1 | 1 |
| Theoretical gel content (%) | 60 | 60 | 60 | 60 | 60 |
| Measured gel content (%) | 84 | 66 | 85 | 69 | 68 |
| Graft ratio (%) | 60 | 16 | 62 | 22 | 21 |
| Particle diameter (coagulation temperature 80° C.) | | | | | |
| 20 mesh on | 10 | 36 | 4 | 35 | 42 |
| 100 mesh on | 74 | 63 | 78 | 64 | 58 |
| Pass | 16 | 1 | 18 | 1 | 0 |
| Impact strength | 18.6 | 11.4 | 10.3 | 12.5 | 7.5 |

As shown in Table 3, Comparative Example 8 exhibits decreased grafting efficiency by using a nitrogen radical monomer in an acrylic core, when compared with Example 5. In the case of Comparative Example 9, a large amount of nitrogen radical monomer was used, and thus, coagulation particle diameter is very fine but impact strength decreases. The case of Comparative Example 10 also exhibits decreased grafting efficiency. Such decreased grafting efficiency may be caused by decrease of the probability that nitrogen radicals are present in a surface, due to a large amount of acrylate in the outer enveloping amine-based monomer layer as in Comparative Example 2. As in Comparative Example 3 of Table 1, property deterioration in Comparative Example 11 may be caused by polymer generation that was mainly occurred, instead of grafting, due to application of the activating solution.

TABLE 4

| Classification | Example 6 | Comparative Example 12 | Additional Experimental Example | Comparative Experimental Example |
|---|---|---|---|---|
| Activating solution | X | ○ | X | ○ |
| Amine based monomer (parts by weight) | 0.3 | 0 | 0.15 | 0.15 |
| Theoretical gel content (%) | 70 | 70 | 60 | 60 |
| Measured gel content (%) | 85 | 79 | 80 | 64 |
| Graft ratio (%) | 50 | 30 | 49 | 9 |
| Particle diameter (coagulation temperature 80° C.) | | | | |
| 20 mesh on | 31 | 77 | 23 | 20 |
| 100 mesh on | 67 | 23 | 68 | 76 |
| Pass | 2 | 0 | 9 | 4 |
| Impact strength | 23.4 | 17.0 | 17.1 | 14.0 |

As shown in Table 4, it can be confirmed that Example exhibits a satisfactory particle diameter and enhanced impact strength due to well-performed grafting in spite of increased rubber content. However, in Comparative Example 12 in which a rubber content was increased, a graft ratio is decreased, and a very coarse and poor coagulation particle diameter is exhibited.

It can be confirmed that, in Additional Experimental Example in which allyl methacrylate and a nitrogen radical generation monomer were used together, satisfactory results are exhibited, but in Additional Comparative Experimental Example in which the activating solution was added, a graft ratio is poor.

EXAMPLE 7

Seed Comprising Amine Based Monomer-Containing Outer Enveloping Layer

A four-neck flask reactor equipped with a stirrer, a thermometer, nitrogen input hole, and a reflux condenser was prepared, and 110 parts by weight of deionized water and 1.0 parts by weight of lauric sodium salt (3%) were input thereto.

9 parts by weight of styrene, 1 part by weight of acrylonitrile and 0.07 parts by weight of ethylene glycol dimethacrylate as a cross-linking agent were added batchwise to a polymerization reactor substituted with a nitrogen atmosphere, and temperature was elevated up to 70° C. Subsequently, 0.1 parts by weight of potassium persulfate initiator was added thereto batchwise to initiate polymerization. The polymerization was carried out for 30 minutes.

0.02 parts by weight of n-vinylformamide as an amine based monomer was input batchwise to a reactor comprising a hard seed latex obtained as described above, and reaction was terminated after maintaining reaction for 30 minutes, thereby forming an outer enveloping layer enveloping the hard seed.

The hard seed latex having the outer enveloping amine-based monomer layer has a polymerization transition ratio of 98.6%, a gel content of 99.0%, and an average diameter of 70 nm.

<Acrylic Core>

In order to perform core polymerization of enveloping the amine based monomer-containing outer enveloping layer, a mixture comprising 10 parts by weight of the rubber seed latex (on the basis of solid content), 20 parts by weight of distilled water, 55 parts by weight of butyl acrylate, 0.3 parts by weight of ethylene glycol dimethacrylate as a cross-linking agent, 0.5 parts by weight of allyl methacrylate and 0.6 parts by weight of sodium lauryl sulfate, based on 100 parts by weight of total monomers, was prepared in the reactor, and the prepared mixture and 0.25 parts by weight of t-butylhydroperoxide (TBHP) were continuously input at 70° C. over three hours. After terminating the input, polymerization was carried out for 21 hours, thereby preparing rubber core latex having an average diameter of 150 nm and a gel content of 93.2%.

<Hard Shell>

A mixture comprising 26.25 parts by weight of a styrene monomer, 8.75 parts by weight of an acrylonitrile monomer, 0.5 parts by weight of sodium lauryl sulfate and 16 parts by weight of distilled water was prepared in the reactor, and the mixture and 0.2 parts by weight of a potassium persulfate initiator were maintained at 75° C. and then reacted for one hour. Inner temperature of the reactor was cooled and then polymerization was terminated, thereby obtaining seed-core-shell structure copolymer latex having an average particle diameter of 170 nm.

<Multilayered Copolymer Powder>

The copolymer latex was subjected to atmospheric coagulation at 80° C. using an aqueous calcium chloride solution, and then aged, washed and dehydrated at 95° C. Subsequently, drying was carried out with 90° C. wind for 30 minutes, thereby obtaining a multilayered copolymer powder. Particle diameter of the obtained powder was measured using a 10 mesh with a mesh size of 2.0 mm. When the amount of powder that did not pass through the mesh was less than 10% based on the total amount of powder, it was judged as "satisfactory".

<Thermoplastic Resin Composition>

40 parts by weight of the multilayered copolymer powder, 60 parts by weight of SAN (comprising 45 parts by weight of styrene and 15 parts by weight of acrylonitrile, and having a refractive index of 1.573), 1 part by weight of a lubricant, 0.5 parts by weight of an antioxidant, and 0.5 parts by weight of a UV Stabilizer were mixed to prepare a thermoplastic resin composition.

Powder characteristics (particle diameter of dry powder), impact strength and dyeability of the obtained thermoplastic resin composition were measured. Results are summarized in Table 5 below.

<Property Evaluation Test>

Particle diameter (coagulation temperature 80° C.): coagulation was carried out at 80° C. upon ASA latex coagulation, and uniformity of a particle size of an obtained dry powder was measured using a mesh.

Resin dyeability: 1 wt % carbon black was added upon resin processing and L values of colorability-measured specimens were measured using a color difference meter. Dark black is exhibited with decreasing L value, which means good pigment-colorability.

EXAMPLES 8 TO 9 AND COMPARATIVE EXAMPLES 13, 14-1, 14-2 and 15

The same process as in Example 7 was repeated, except that a monomer type of a seed, a core and a shell, and a use amount thereof, a use amount of amine based monomer, a use amount of cross-linking agent, a use amount of grafting agent and an activating solution (6.67 parts by weight of formaldehyde sodium sulfoxylate (3%), 0.52 parts by weight of disodium ethylenediaminetetraacetate (3%) and 0.03 parts by weight of ferrous sulfate (3%)) were used as suggested in Table 5 below. In addition, a multilayered copolymer powder was prepared, a gel content and an average particle diameter were measured in the same manner as in Example 7, and properties were evaluated. Results are summarized in Table 5 below.

TABLE 5

| | Classification | Examples | | | Comparative Examples | | | |
| --- | --- | --- | --- | --- | --- | --- | --- | --- |
| | | 7 | 8 | 9 | 13 | 14-1 | 14-2 | 15 |
| Seed | SM | 9 | 9 | — | 9 | 9 | 9 | — |
| | BA | — | — | 10 | — | — | — | 10 |
| | AN | 1 | 1 | — | 1 | 1 | 1 | — |
| | Amine based monomer | 0.02 | 0.01 | 0.015 | — | — | — | — |
| | Cross-linking agent | 0.07 | 0.07 | 0.07 | 0.05 | 0.05 | 0.05 | 0.05 |
| | Grafting agent | — | — | — | 0.05 | 0.05 | 0.1 | 0.05 |
| | Gel Content (%) | 99.0 | 98.9 | 98.9 | 98.4 | 98.7 | 99.1 | 98.3 |
| | Average diameter (nm) | 70 | 200 | 150 | 70 | 200 | 200 | 150 |
| Core | BA | 55 | 55 | 50 | 55 | 55 | 55 | 50 |
| | Activating solution | — | — | — | 0.2 | 0.2 | 0.2 | 0.2 |
| | Gel content (%) | 93.2 | 96.9 | 95.0 | 88.7 | 88.1 | 91.1 | 89.6 |
| | Average diameter (nm) | 150 | 380 | 230 | 150 | 380 | 380 | 230 |
| Shell | SAN | 35 | 35 | 40 | 35 | 35 | 35 | 40 |
| Latex | Average diameter (nm) | 170 | 440 | 280 | 170 | 440 | 440 | 280 |
| Property evaluation | Particle diameter (coagulation temperature 80° C.) | Satisfactory | Satisfactory | Satisfactory | Poor | Poor | Slightly poor | Slightly poor |
| | Impact strength | 17.3 | 25.9 | 22.3 | 15.1 | 24.2 | 23.1 | 20.8 |
| | Pigment colorability | 27.7 | 30.5 | 31.4 | 27.7 | 30.7 | 30.4 | 31.5 |

As shown in Table 5, it can be confirmed that the thermoplastic resin composition of Example 7 according to the present invention exhibits an enhanced particle diameter and enhanced impact strength while maintaining dyeability, when compared with the thermoplastic resin composition of Comparative Example 13 in which the amine based monomer was not comprised and the grafting agent was comprised.

It can be confirmed that the thermoplastic resin composition of Example 8 according to the present invention exhibits an enhanced particle diameter and enhanced impact strength while maintaining dyeability, when compared with the thermoplastic resin compositions of Comparative Example 14-1 and Comparative Example 14-2 in which the amine based monomer was not comprised and the grafting agent was comprised. Furthermore, the thermoplastic resin composition of Example 9 according to the present invention exhibits an enhanced particle diameter and enhanced impact strength while maintaining dyeability, when compared with the thermoplastic resin composition of Comparative Example 15 in which the amine based monomer was not comprised and the grafting agent was comprised.

REFERENCE EXAMPLES 1 to 3

As an additional experiment of Example 7 not using a grafting agent, the same process as in Example 7 was repeated, except that monomer types of a seed, a core and a shell, and use amounts thereof, a use amount of amine based monomer, a use amount of cross-linking agent, an activating solution (comprising 6.67 parts by weight of formaldehyde sodium sulfoxylate (3%), 0.52 parts by weight of disodium ethylenediaminetetraacetate (3%) and 0.03 parts by weight of ferrous sulfate (3%)), etc. were used as summarized in Table 6 below, thereby preparing a multilayered copolymer powder. A gel content and an average particle diameter were measured in the same manner as in Example 7, and properties were evaluated. Results are summarized in Table 6 below.

TABLE 6

| | | Examples | | | Reference Examples | | |
|---|---|---|---|---|---|---|---|
| | Classification | 7 | 8 | 9 | 1 | 2 | 3 |
| Seed | SM | 9 | 9 | — | 9 | 9 | — |
| | BA | — | — | 10 | — | — | 9 |
| | AN | 1 | 1 | — | 1 | 1 | — |
| | Amine based monomer | 0.02 | 0.01 | 0.015 | 0.001 | 0.01 | 1 |
| | Cross-linking agent | 0.07 | 0.07 | 0.07 | 0.07 | 0.07 | 0.07 |
| | Grafting agent | — | — | — | — | — | — |
| | Gel content (%) | 99.0 | 98.9 | 98.9 | 98.9 | 98.9 | 98.1 |
| | Average diameter (nm) | 70 | 200 | 150 | 70 | 200 | 150 |
| Core | BA | 55 | 55 | 50 | 55 | 55 | 50 |
| | Activating solution | — | — | — | — | 0.2 | — |
| | Gel content (%) | 93.2 | 96.9 | 95.0 | 86.9 | 82.9 | 94.5 |
| | Average diameter (nm) | 150 | 380 | 230 | 150 | 380 | 230 |
| Shell | SAN | 35 | 35 | 40 | 35 | 35 | 40 |
| | Average diameter (nm) | 170 | 440 | 280 | 170 | 440 | 280 |
| Property evaluation | Particle diameter (coagulation temperature 80° C.) | Satisfactory | Satisfactory | Satisfactory | Poor | Poor | Satisfactory |
| | Impact strength | 17.3 | 25.9 | 22.3 | 14.7 | 15.9 | 18.9 |
| | Pigment colorability | 27.7 | 30.5 | 31.4 | 28.6 | 32.5 | 30.8 |

As shown in Table 6, it can be confirmed that the thermoplastic resin composition of Example 7 according to the present invention exhibits an enhanced particle diameter and enhanced impact strength while maintaining dyeability, when compared with the thermoplastic resin composition of Reference Example 1 in which a very small amount of the amine based monomer was comprised and the grafting agent was not comprised.

It can be confirmed that the thermoplastic resin composition of Example 8 according to the present invention exhibits slightly decreased dyeability, but an enhanced particle diameter and enhanced impact strength, when compared with the thermoplastic resin composition of Reference Example 2 in which a suitable amount of the amine based monomer was comprised, the grafting agent was not comprised, and a specific activating solution comprised in a core was comprised.

Furthermore, it can be confirmed that the thermoplastic resin composition of Example 9 according to the present invention exhibits enhanced dyeability and impact strength, when compared with the thermoplastic resin composition of Reference Example 3 in which a large amount of the amine based monomer was comprised and the grafting agent was not comprised.

What is claimed is:

1. An acrylate-styrene-acrylonitrile copolymer comprising:
    a core including an acrylic rubber;
    a shell including styrene acrylonitrile resin (SAN); and
    a monomer layer including an amine group, the monomer layer being disposed between the core and the shell,
    wherein the shell is a graft shell that lacks an activating solution.

2. The acrylate-styrene-acrylonitrile copolymer according to claim 1, wherein the monomer layer envelops the core.

3. The acrylate-styrene-acrylonitrile copolymer according to claim 2, wherein an amount of the monomer layer is 0.05 to 1 part by weight based on a total weight of the copolymer.

4. The acrylate-styrene-acrylonitrile copolymer according to claim 2, wherein the core is a soft core, and comprises $C_1$ to $C_8$ alkyl acrylate and a peroxide initiator.

5. The acrylate-styrene-acrylonitrile copolymer according to claim 2, wherein the core and the monomer layer comprise a structure including 90 to 99.99% by weight of the core and 0.01 to 10% by weight of the monomer layer.

6. The acrylate-styrene-acrylonitrile copolymer according to claim 2, wherein the core further comprises a cross-linking acrylic agent and a grafting agent.

7. The acrylate-styrene-acrylonitrile copolymer according to claim 2, wherein the core includes an emulsion polymer comprising 85 to 99.89% by weight of an acrylic compound and 0.1 to 5% by weight of a cross-linking agent.

8. The acrylate-styrene-acrylonitrile copolymer according to claim 2, wherein the monomer layer is an emulsion polymer comprising 0 to 5% by weight of an acrylic compound, 0.01 to 5% by weight of an amine based monomer, and 0 to 0.5% by weight of a cross-linking agent.

9. The acrylate-styrene-acrylonitrile copolymer according to claim 2, wherein a weight ratio of a monomer constituting the core to a monomer constituting the shell is 40:60 to 80:20, based on a total weight of the copolymer.

10. The acrylate-styrene-acrylonitrile copolymer according to claim 1, wherein the monomer layer comprises a monomer selected from at least one of N-vinylformamide, N-vinylacetamide, N-vinylpropionamide, N-vinyl butyramide, N-vinyl 2-methyl propionamide, N-methyl acrylamide, N-ethyl acrylamide, N-n-propyl acrylamide, N-n-butyl acrylamide, N-isopropyl acrylamide, O-benzyl-N-vinylcarbamate, methyl N-vinylcarbamate, and N-vinyl tert-butyl carbamate.

11. The acrylate-styrene-acrylonitrile copolymer according to claim 1, wherein the monomer layer is a first monomer layer, and wherein the core envelops a seed having a second monomer layer.

12. The acrylate-styrene-acrylonitrile copolymer according to claim 11, wherein an amount of the second monomer layer is in a range of greater than 0.001 and less than 1 part by weight, based on a total weight of the copolymer.

13. The acrylate-styrene-acrylonitrile copolymer according to claim 11, wherein the seed has a two-layer structure that comprises a hard seed and the second monomer layer, the two-layer structure comprising at least one monomer selected from $C_1$ to $C_8$ alkyl (meth)acrylate based monomers, styrene based monomers and acrylonitrile based monomers, a persulfate initiator or a peroxide initiator, a cross-linking agent, and an emulsifier.

14. The acrylate-styrene-acrylonitrile copolymer according to claim 13, wherein a gel content of the hard seed is 95.0 to 99.8%.

15. The acrylate-styrene-acrylonitrile copolymer according to claim 11, wherein the core lacks the activating solution and a gel content of the acrylic rubber core is 85.0 to 99.5%.

16. The acrylate-styrene-acrylonitrile copolymer according to claim 11, wherein a weight ratio of a monomer constituting the seed to a monomer constituting the core to a monomer constituting the shell is 5 to 15:25 to 75:20 to 60.

17. The acrylate-styrene-acrylonitrile copolymer according to claim 1, wherein the shell is a hard shell comprising at least one monomer selected from $C_1$ to $C_8$ alkyl (meth) acrylate based monomers, styrene based monomers, and acrylonitrile based monomers.

18. The acrylate-styrene-acrylonitrile copolymer according to claim 1, wherein the core and the shell comprise a structure including 40 to 80% by weight of the core, 19 to 40% by weight of an aromatic vinyl compound, and 1 to 20% by weight of a vinyl cyano compound.

19. The acrylate-styrene-acrylonitrile copolymer according to claim 1, wherein the acrylate-styrene-acrylonitrile copolymer has 70% grafting efficiency or more.

20. A thermoplastic resin composition comprising a thermoplastic resin and an impact modifier, wherein the impact modifier comprises the acrylate-styrene-acrylonitrile copolymer according to claim 2, and the thermoplastic resin is a hard matrix resin.

* * * * *